United States Patent
Jacobs (10) Patent No.: US 7,290,703 B2
(45) Date of Patent: Nov. 6, 2007

(54) METHOD AND APPARATUS FOR PROVIDING MULTIPLE TRANSACTION CARDS IN ASSEMBLY

(75) Inventor: David A. Jacobs, Hopkinton, MA (US)

(73) Assignee: Arthur Blank & Company, Inc., Boston, MA (US)

( * ) Notice: Subject to any disclaimer, the term of this patent is extended or adjusted under 35 U.S.C. 154(b) by 158 days.

(21) Appl. No.: 11/028,170

(22) Filed: Jan. 3, 2005

(65) Prior Publication Data

US 2006/0144926 A1 Jul. 6, 2006

(51) Int. Cl.
- *G06K 5/00* (2006.01)
- *B42D 15/00* (2006.01)
- *G09C 3/00* (2006.01)
- *G09F 3/00* (2006.01)
- *B65D 65/28* (2006.01)

(52) U.S. Cl. .................. 235/380; 283/74; 428/42.3; 428/43; 40/674

(58) Field of Classification Search ............... 235/380, 235/379, 487, 492; 283/74; 428/42.3, 43; 40/674
See application file for complete search history.

(56) References Cited

U.S. PATENT DOCUMENTS

| | | | |
|---|---|---|---|
| 2,434,545 A | 1/1948 | Brady, Jr. et al. | |
| 2,831,277 A | 4/1958 | Strachan | |
| 3,038,597 A | 6/1962 | Brady, Jr. | |
| 3,226,862 A | 1/1966 | Gabruk | |
| 3,242,959 A * | 3/1966 | Glass | 206/37 |
| 3,568,829 A | 3/1971 | Brady, Jr. | |
| 3,583,317 A * | 6/1971 | Gibson | 283/98 |
| 3,622,995 A | 11/1971 | Dilks et al. | |
| 3,632,995 A | 1/1972 | Wilson | |
| 3,808,718 A | 5/1974 | Christiansen | |
| 3,822,492 A | 7/1974 | Crawley | |
| 3,896,246 A | 7/1975 | Brady, Jr. | |
| 3,914,483 A | 10/1975 | Stipek, Jr. | |
| 3,965,598 A | 6/1976 | Avery | |
| 4,060,168 A | 11/1977 | Romagnoli | |
| 4,066,873 A | 1/1978 | Schatz | |
| 4,126,333 A | 11/1978 | Dickinson | |
| 4,272,327 A | 6/1981 | Logan | |
| 4,359,633 A | 11/1982 | Bianco | |
| 4,372,681 A | 2/1983 | Sallenbach | |
| RE31,211 E | 4/1983 | Whitehead | |
| 4,379,573 A | 4/1983 | Lomeli et al. | |
| 4,544,590 A | 10/1985 | Egan | |
| 4,620,727 A * | 11/1986 | Stockburger et al. | 283/82 |
| 4,627,643 A | 12/1986 | Leonetti et al. | |
| 4,643,455 A * | 2/1987 | North et al. | 283/81 |

(Continued)

*Primary Examiner*—Daniel Walsh
(74) *Attorney, Agent, or Firm*—Wolf, Greenfield & Sacks, P.C.

(57) ABSTRACT

A transaction card assembly and method for forming a transaction card assembly. The transaction card assembly may include two or more transaction cards that are each useable with different issuers. A first transaction card may be useable only with a first issuer, and the second transaction card may be useable with one or more entities other than the first issuer. The transaction card assembly may be formed from a same piece of material and may include one or more machine-readable features, such as a barcode, magnetic strip or electronic device. The transaction cards may meet ANSI and ISO specifications, e.g., after the cards are separated from each other without the use of tools.

35 Claims, 3 Drawing Sheets

U.S. PATENT DOCUMENTS

| | | | |
|---|---|---|---|
| 4,682,692 A | 7/1987 | Kessler | |
| 4,724,166 A | 2/1988 | deBruin | |
| 4,726,131 A | 2/1988 | Cass | |
| 4,778,153 A | 10/1988 | Bachman et al. | |
| 4,815,768 A | 3/1989 | Applebaum et al. | |
| 4,829,690 A * | 5/1989 | Andros | 40/661.06 |
| 4,839,507 A | 6/1989 | May | |
| 4,854,610 A | 8/1989 | Kwiatek | |
| 4,872,707 A | 10/1989 | deBruin | |
| 4,944,532 A | 7/1990 | Pollard | |
| 4,957,311 A | 9/1990 | Geisenheimer | |
| 4,958,066 A | 9/1990 | Hedgcoth | |
| 4,972,476 A | 11/1990 | Nathans | |
| 4,978,146 A * | 12/1990 | Warther et al. | 283/81 |
| 5,002,313 A | 3/1991 | Salvatore | |
| 5,019,697 A | 5/1991 | Postman | |
| 5,020,931 A | 6/1991 | Sloot | |
| 5,067,713 A | 11/1991 | Soules et al. | |
| 5,131,516 A | 7/1992 | Clough | |
| 5,173,081 A | 12/1992 | Greig | |
| 5,281,799 A | 1/1994 | McIntire et al. | |
| 5,282,649 A | 2/1994 | Williams et al. | |
| 5,299,834 A | 4/1994 | Kraige | |
| 5,308,120 A | 5/1994 | Thompson | |
| 5,388,815 A * | 2/1995 | Hill et al. | 270/32 |
| 5,390,794 A | 2/1995 | Vulpitta | |
| 5,427,832 A | 6/1995 | Longtin | |
| 5,438,928 A | 8/1995 | Chatwin | |
| 5,494,544 A * | 2/1996 | Hill et al. | 156/64 |
| 5,495,981 A * | 3/1996 | Warther | 229/71 |
| 5,501,491 A | 3/1996 | Thompson | |
| 5,506,395 A | 4/1996 | Eppley | |
| 5,514,860 A | 5/1996 | Berson | |
| 5,522,623 A | 6/1996 | Soules et al. | |
| 5,531,482 A | 7/1996 | Blank | |
| 5,538,291 A | 7/1996 | Gustafson | |
| 5,578,808 A * | 11/1996 | Taylor | 235/380 |
| 5,594,233 A | 1/1997 | Kenneth et al. | |
| 5,609,253 A | 3/1997 | Goade, Sr. | |
| 5,632,511 A * | 5/1997 | Longtin et al. | 283/62 |
| 5,640,447 A * | 6/1997 | Fonseca | 379/114.18 |
| 5,650,209 A * | 7/1997 | Ramsburg et al. | 428/43 |
| 5,662,976 A * | 9/1997 | Popat et al. | 428/40.1 |
| 5,720,158 A | 2/1998 | Goade, Sr. | |
| 5,740,915 A | 4/1998 | Williams | |
| 5,769,457 A * | 6/1998 | Warther | 283/61 |
| 5,844,230 A * | 12/1998 | Lalonde | 235/487 |
| 5,863,076 A | 1/1999 | Warther | |
| 5,868,498 A | 2/1999 | Martin | |
| 5,887,899 A | 3/1999 | Dobbins | |
| 5,918,909 A * | 7/1999 | Fiala et al. | 283/61 |
| 5,921,584 A | 7/1999 | Goade, Sr. | |
| 5,949,058 A | 9/1999 | Kimura | |
| 5,955,961 A * | 9/1999 | Wallerstein | 340/5.4 |
| 5,997,042 A * | 12/1999 | Blank | 283/61 |
| 6,036,099 A | 3/2000 | Leighton | |
| 6,039,356 A * | 3/2000 | Warther et al. | 283/61 |
| 6,099,043 A * | 8/2000 | Story | 283/99 |
| 6,109,439 A | 8/2000 | Goade, Sr. | |
| 6,173,901 B1 | 1/2001 | McCannel | |
| 6,199,757 B1 | 3/2001 | Kulbert | |
| 6,294,237 B1 | 9/2001 | Popat | |
| 6,305,716 B1 * | 10/2001 | Warther et al. | 283/61 |
| 6,315,206 B1 | 11/2001 | Hansen et al. | |
| 6,328,341 B2 * | 12/2001 | Klure | 283/62 |
| 6,439,613 B2 * | 8/2002 | Klure | 283/62 |
| 6,585,845 B1 | 7/2003 | Peterson | |
| 6,588,658 B1 * | 7/2003 | Blank | 235/380 |
| 6,793,141 B1 * | 9/2004 | Graham | 235/487 |
| 6,957,737 B1 * | 10/2005 | Frederickson et al. | 206/449 |
| 6,994,262 B1 * | 2/2006 | Warther | 235/492 |
| 7,036,723 B1 * | 5/2006 | Hill et al. | 235/380 |
| D524,858 S * | 7/2006 | Graves et al. | D19/9 |
| D524,859 S * | 7/2006 | Graves et al. | D19/9 |
| 7,128,261 B1 * | 10/2006 | Henderson et al. | 235/383 |
| 7,172,127 B1 * | 2/2007 | Poland | 235/486 |
| 7,210,621 B2 * | 5/2007 | Woronec | 235/380 |
| 2002/0074246 A1 * | 6/2002 | Tiscione et al. | 206/39.4 |
| 2004/0249748 A1 * | 12/2004 | Schultz et al. | 705/39 |
| 2005/0242193 A1 * | 11/2005 | Smith et al. | 235/487 |
| 2005/0269415 A1 * | 12/2005 | Licciardello et al. | 235/493 |
| 2006/0144926 A1 * | 7/2006 | Jacobs | 235/380 |
| 2006/0186196 A1 * | 8/2006 | Schultz et al. | 235/380 |
| 2006/0207129 A1 * | 9/2006 | Parsley | 40/124.03 |
| 2007/0040030 A1 * | 2/2007 | Kranzley et al. | 235/451 |
| 2007/0063052 A1 * | 3/2007 | Chakiris et al. | 235/486 |

* cited by examiner

METHOD AND APPARATUS FOR PROVIDING MULTIPLE TRANSACTION CARDS IN ASSEMBLY

BACKGROUND OF THE INVENTION

This invention relates to transaction cards.

Transaction cards, such as credit and debit cards, gift cards, membership cards, promotional cards, e.g., frequent flyer cards, identification cards and the like, are widely used. Such transaction cards may include a variety of different indicia to identify the card, the individual using the card, a transaction account (such as a credit card account), and/or other features. The indicia may be represented in a string of alphanumeric characters, a bar code, an encoded magnetic strip, and/or a programmed electronic chip attached to the card (including electronic devices embedded in the card, RFID antennas, etc.).

SUMMARY OF THE INVENTION

In one aspect of the invention, a transaction card assembly includes at least a first transaction card having a first machine readable feature that is useable in a transaction involving the first transaction card, and a second transaction card having a second machine readable feature that is useable in a transaction involving the second transaction card. For example, the first and second transaction cards each may be a gift card, a pre-paid phone card, a pre-paid credit card, a frequent shopper card, a loyalty card, a health care card, and/or a membership card. The first machine readable feature may represent a first account associated with the first transaction card, and the first transaction card may be useable only in a transaction with a first issuer of the first transaction card. The second machine readable feature may represent a second account associated with the second transaction card, and the second transaction card may be useable in a transaction with an entity other than the first issuer. The first and second transaction cards may be connected together and arranged for selective separation by a user at or before a time of using the first or second transaction cards. Thus, the transaction cards may be displayed and sold or otherwise provided to a user as a unit. In one embodiment, the second transaction card may be useable only with a second issuer of the second transaction card that is different from the first issuer, potentially providing the user with the convenience or other advantages of having two different issuer's transaction cards connected together, e.g., to give the connected cards as a gift.

The first and second transaction cards may be formed of a single sheet of material, and a line of weakness may be formed between the transaction cards to allow them to be selectively separated from each other. The line of weakness may be a scoring on one or both sides of the sheet of material, and may be formed so that at least one of the cards meets ANSI and/or ISO specifications for edge roughness for transaction cards after separation of the cards.

A label may be attached to the transaction card assembly and may carry indicia that matches indicia in a machine readable feature on one or both of the cards. The label may be removable and reuseable, e.g., adherable to another card or other support, such as a registration form. The label may conceal information, such as a personal identification number (PIN) on one of the cards. The label may be arranged to detect tampering, e.g., may be a scratch-off label or other label that is destroyed or otherwise changed in a detectable way when an attempt is made to remove the label.

In another aspect of the invention, a method for forming a transaction card assembly includes providing a single sheet of material, and cutting at least one transaction card assembly including at least first and second transaction cards from the sheet of material. A line of weakness is provided between the first and second transaction cards so that the first and second transaction cards are separable from each other without the use of tools. A machine readable feature is provided for each of the transaction cards, where the machine readable features include indicia unique from each other. The first transaction card may be useable only in a transaction with a first issuer of the first transaction card, and the second transaction card may be useable in a transaction with an entity other than the first issuer.

In another aspect of the invention, a method of providing transaction card assemblies includes providing a transaction card assembly having at least first and second transaction cards connected to each other that are arranged for selective separation by a user at or before a time of using the first or second transaction cards. The first transaction card has a first machine readable feature that is useable in a transaction involving the first transaction card and represents a first account associated with the first transaction card. The first transaction card may be useable only in a transaction with a first issuer of the first transaction card. The second transaction card has a second machine readable feature that is useable in a transaction involving the second transaction card and represents a second account associated with the second transaction card. The second transaction card may be useable in a transaction with an entity other than the first issuer. One of the first and second machine readable features may be read to obtain information representing the first or second account, the information may be transmitted, and the first and second accounts activated so as to render the first and second transaction cards useable in one or more transactions. Thus, the accounts for two or more cards in an assembly may be activated by reading the machine readable feature of only one card.

These and other aspects of the invention will be apparent and/or obvious in view of the following description.

BRIEF DESCRIPTION OF THE DRAWINGS

Illustrative embodiments of the invention are described below with reference to the following drawings, in which like numerals reference like elements, and wherein.

DETAILED DESCRIPTION

As discussed above, transaction cards are widely used for a variety of different purposes, such as for credit and debit account purchases, tracking member activity (e.g., tracking frequent flyer activity), for gift-certificate purchases, and so on. Vendors issuing transaction cards for tracking member activity typically wish to ensure that users of an account receive transaction cards, keytags or other devices that are appropriately associated with the membership account. Vendors may also wish to provide advertising or other promotional information with a transaction card, e.g., to defer some of the cost of issuing the transaction card by having others pay for advertising included with the transaction card. As one example, a vendor may wish to issue a gift card or prepaid telephone card that entitles the bearer to a specified amount of purchase or telephone use credit. Advertising may be provided with the transaction card on a portion attached to the card to promote the vendor's service or other goods or services.

In one aspect of the invention, a transaction card assembly includes two or more transaction cards that are connected together, e.g., so that a customer may purchase the transaction card assembly at a point of sale (POS). These transaction cards may each be associated with different issuers, i.e., a store, retailer, vendor, service provider or other entity that provides products and/or services (including purchasing services provided by a credit card issuer) in connection with the transaction card. Thus, each transaction card may be associated with a different account that is used when entering into a transaction with the transaction card.

For example, a transaction card assembly may include a first gift card issued by a restaurant chain and a second gift card issued by a movie theater. The first card may be useable only with the first issuer (i.e., only at restaurants that are part of the issuer restaurant chain), and the second card may be useable only with the second issuer (i.e., only at the issuing movie theater). A customer may purchase the transaction card assembly, have both cards activated, and then give the transaction card assembly as a gift to a friend, i.e., a gift of a dinner and movie. The user may keep the cards connected until putting them to use, i.e., separating the cards before using them to purchase a meal and movie tickets, respectively.

In another embodiment, a transaction card assembly may include a first gift card issued by a retailer, and a second pre-paid telephone card issued by a long distance telephone service provider. The first gift card may be useable only at the retailer's stores. The second card may be useable to obtain long distance calling services. The transaction card assembly may make a suitable gift to a new college student, e.g., by allowing the student to make needed purchases when starting school and providing an easy way to make long distance calls.

In another embodiment, a transaction card assembly may include a first gift card issued by a retailer, and a second pre-paid credit card useable for the purchase of goods/services with any product and/or service provider that accepts the issuing bank's credit cards. (Such pre-paid credit cards are commonly offered for sale as gift cards that are useable in ways identical to conventional credit cards, with some exceptions such as using the pre-paid card to purchase airline tickets, rent vehicles, etc.) Thus, the first card may be useable only with the retailer's stores, while the second card may be useable at a plurality of different service/good providers.

The use of such cards to obtain goods/services is well known to those of skill in the art. For example, an account number or other indicia encoded in a magnetic strip, barcode, printed alphanumeric text, or electronic chip can be read by the good/service provider at the time of purchase and an account associated with the card debited appropriately. In some cases, account information may be maintained in a computer system of the good/service provider or a third party (e.g., like that in the case of credit cards), and may be adjusted accordingly, e.g., have a dollar amount debited to the account consistent with the value of the goods/services obtained. In other embodiments, account information in the card itself may be adjusted. For example, so-called smart-cards or other cards with an electronic chip or other device may include account information that is adjusted when goods/services are obtained with the card. As will be understood, communications with the chip or other device, and the information stored in the chip, may be suitably encrypted or otherwise protected from tampering or other unauthorized access/modification.

In another aspect of the invention, all of the accounts associated with the transaction cards in an assembly, i.e., two or more cards, may be activated by reading information from one of the transaction cards and activating all of the transaction card accounts based on the information on one of the transaction cards. For example, a transaction card assembly may include two or more connected gift cards. The accounts associated with each gift card may be activated by reading an account number from one of the cards, and transmitting the number to an appropriate entity that causes both the account associated with the transmitted account number and the account for the other gift card to be activated.

In the example above in which two gift cards are included in a transaction card assembly, when the assembly is purchased, the indicia included on one of the gift cards, e.g., in an encoded magnetic strip, barcode, alphanumeric string, electronic chip, etc., can be read and used to activate the corresponding account(s). In addition, the account associated with the other gift card may also be activated without reading the account number and/or other information from the other gift card. Such an arrangement can help simplify the activation process, e.g., by avoiding the need to read the account numbers or other indicia on all cards.

Activation of all accounts for all cards in a transaction assembly can be made possible by keeping track of the account numbers or other information for the transaction cards in each assembly at the time of manufacture. For example, where a plurality of transaction assemblies are produced each having two or more gift cards, a database may be built including the association of all indicia for each gift card in each assembly. Thus, the database may include a record for each transaction card assembly that indicates an account number or other indicia for a first gift card in the assembly and an account number or other indicia for the second gift card in the assembly. When the transaction card assembly is purchased, the indicia from one of the gift cards may be read and sent to the entity responsible for activating the gift cards. The database may be accessed to determine the account number or other indicia of the unread gift card, and both accounts may be activated as appropriate.

Such an arrangement may be useful when one of the cards includes indicia that is not easily read at the time of activation. For example, in transaction card assemblies that have a gift card with a readable magnetic strip and a pre-paid telephone card having printed alphanumeric text obscured by a scratch-off label, the indicia on the telephone card (the printed text) may be difficult or impossible to read without removing scratch-off label. However, in accordance with one aspect of the invention, the telephone card may be activated by reading indicia in the gift card's magnetic strip, looking up the telephone card indicia that corresponds to the gift card, and activating both accounts.

Figure 1:
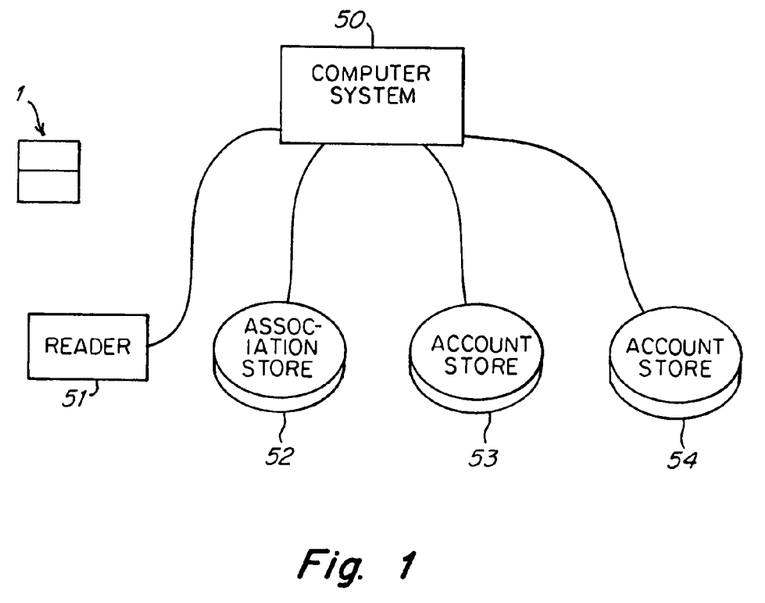
FIG. 1 is a schematic diagram of a system for activating transaction card assemblies.

FIG. 1 shows an illustrative system for administering a transaction card arrangement in accordance with the invention. A transaction card assembly 1 including two or more transaction cards each having unique indicia is obtained by a customer. (Although a transaction card assembly may have any suitable number of transaction cards, in this example, the assembly 1 has two transaction cards.) The customer may obtain the transaction card assembly 1 by purchase at a point-of-sale, as part of a "free" promotion, in exchange for providing personal information when signing up for a customer loyalty program, or in other ways.

Indicia on one of the transaction cards may be read by a reader 51, such as a magnetic strip reader, barcode reader, optical scanner and optical character recognition software, RFID tag reader or other suitable device. The reader 51 may be located at the point-of-sale or other location where the customer receives the transaction card assembly 1. The indicia, or some representation of the indicia, may be sent by the reader 51 to a computer system 50, which may include a computer network or other suitable data processing arrangement. The computer system 50 may be located remotely from the reader 51, and may communicate with the reader 51 by a telephone network, a public or private computer network (a LAN and/or the Internet), a wireless communication system, or any other suitable arrangement or combination of arrangements. Various portions of the computer system 50 may be owned and/or operated by different entities, such as a bank, one or more of the card issuers, a manufacturer of the assembly 1, a third party transaction handling service provider, etc.

The computer system 50 may communicate with an association store 52 that includes information regarding the indicia present on each transaction card for a plurality of transaction card assemblies. For example, the association store 52 may include a database of records, where each record corresponds to a transaction card assembly and lists the indicia (e.g. account numbers), issuer, and/or any other information for each transaction card assembly in a plurality of such assemblies. The association store 52 may be located anywhere in the computer system 50, e.g., at the site of a manufacturer that made the transaction card assemblies and captured the indicia and other information when the card assemblies were made. Thus, by identifying a record that includes the indicia of the card that was read by the reader 51, the computer system 50 may determine from the association store 52 the indicia for the transaction card(s) in the transaction card assembly 1 that was not read by the reader 51, but is associated with the transaction card whose indicia was read.

In an alternate arrangement, indicia from all cards in the assembly 1 may be stored in a machine readable feature of one of the cards. The machine readable feature may be read by the reader 51, and representations of all indicia for all cards in the assembly 1 may be obtained and provided to the computer system 50.

Using this information, the computer system 50 may cause the activation of all transaction cards and associated accounts for the transaction card assembly 1. For example, the computer system 50 may cause the account store 53 associated with accounts for a first transaction card issuer to activate the account for the transaction card that was not read. This activation may be done in any suitable way, such as by noting in an appropriate database record that the transaction card has been purchased and that the associated account is now active. An appropriate value may also be associated with the account, such as a dollar value, number of calling minutes, etc. The computer system 50 may also cause another account store 54 associated with accounts for a second transaction card issuer to activate the account for the transaction card in the assembly whose indicia was not read. The account stores 53 and 54 may be maintained anywhere in the computer system 50, e.g., maintained in the issuer's computer system used to handle transactions regarding the transaction cards. Of course, the computer system 50, association store 52, account stores 53 and 54 and other components of a transaction card activation and management system (a system that tracks the activation and use of the transaction cards) may be operated by one or more third parties to the card issuers, as is often the case with existing gift cards and other similar transaction cards. Information may also be stored in, or otherwise provided to one or more of the transaction cards in the assembly 1, e.g., an account value may be stored in the memory of an electronic chip in one or more of the cards.

Figure 2:
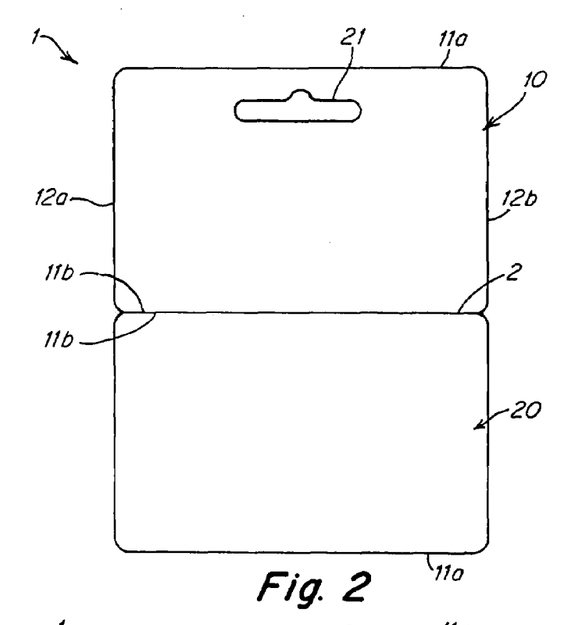
FIG. 2 is a first side of a transaction card assembly in accordance with an embodiment of the invention.
Figure 3:
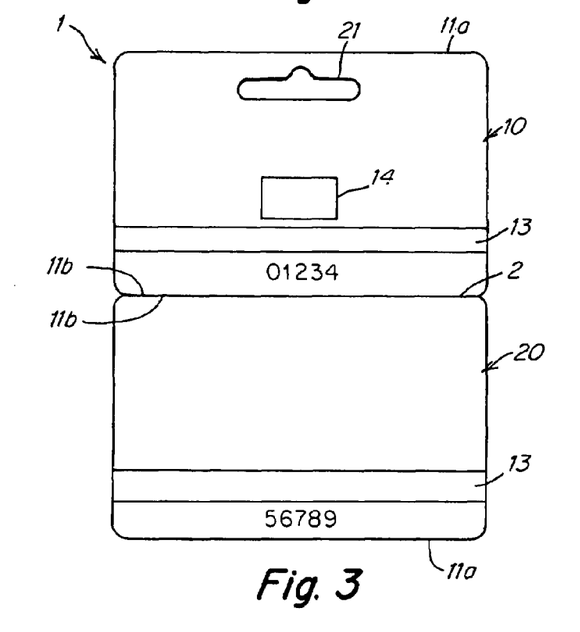
FIG. 3 is a second side of the transaction card assembly of FIG. 2.

Aspects of the invention may be practiced using any suitable arrangement of transaction cards that may be arranged in any suitable way. Below, several different transaction card assembly embodiments are described for purposes of illustration. Specifically, FIGS. 2 and 3 show first and second sides, respectively, of a transaction card assembly in accordance with an embodiment of the invention. It should be understood that FIGS. 2 and 3 show only one illustrative embodiment of the invention and should not be used to narrowly interpret the scope of the invention. In addition, various aspects of the invention are described herein, and these various aspects may be used in any suitable combination.

The transaction card assembly 1 shown in FIG. 2 includes a first transaction card 10 and a second transaction card 20 connected to the first transaction card 10. The first and second transaction cards 10,20 may be used, for example, as a credit or debit card, a membership identification card, an account identification card, a gift card, a prepaid telephone card, and so on. The cards 10,20 may include any printed or otherwise presented material, such as advertising, a logo, issuer name, hologram, handwritten information, a coupon or other purchase rebate information, and so on.

The first and second transaction cards 10,20 may be formed of any suitable material, such as a plastic or paper sheet material. If the first transaction card 10 is intended to meet ANSI and ISO specifications, the first and second transaction cards 10,20 may be made from a sheet of suitable material, e.g., poly vinyl chloride (PVC) or other material (e.g., PET, PETG, ABS or other plastic and/or synthetic materials) having a thickness of 0.030 inches±ten percent. However, ANSI and ISO specifications for transaction cards typically change over time, and therefore the first and second transaction cards 10,20 may be made of any suitable material, have any suitable dimensions or have any other feature to meet with desired ANSI and ISO specifications for transaction cards.

In one illustrative embodiment, the first and second transaction cards 10,20 may be stamped or die cut from a same sheet of plastic material and connected together. A line of weakness 2, which may include perforations, scoring, or other features, may be formed between the first transaction card 10 and the second transaction card 20. Using the line of weakness 2, the first and second transaction cards 10,20 may be separated from each other by folding the second transaction card 20 toward the first transaction card 10 along the line of weakness 2, or by tearing along the line of weakness 2. The line of weakness 2 may be formed to allow separation of the second transaction card 20 from the first transaction card 10 so that the edge(s) where the cards were connected have a smooth edge after separation, e.g., so that one or both cards meet ANSI and ISO specifications for edge roughness. For example, in the case of transaction cards 10,20 formed from a single sheet of PVC material having a clear plastic overlaminate on both sides, the line of weakness 2 may be formed by a scoring on both sides of the sheet. Scoring on both sides of the sheet may be done simultaneously with cutting of the assembly 1 from the sheet so as to ensure proper registration of the scoring with the card shape. The line of weakness 2 is not a required feature, since the first and second transaction cards 10,20 may be separated, if desired, by cutting the first and second transaction cards 10,20 apart, e.g., using a scissor, shear or other suitable device or method.

In an alternative embodiment, the first and second transaction cards 10,20 may be formed separately, and/or may be formed of different materials. The first and second transaction cards 10,20 may then be brought together in an edge-to-edge relationship and connected together, e.g., along mating edges positioned similar to that shown for the line of weakness 2 in FIG. 2. The first and second transaction cards 10,20 may be joined together at the edges by any suitable means, such as thermal welding, an adhesive, a mechanical fastener, a coupling device (e.g., a coupling having opposed channels into which the edges of the first and second transaction cards 10,20 are inserted and held by the channels) and so on.

Alternately, the first and second transaction cards 10,20 need not be joined in an edge-to-edge relationship. Instead, the second transaction card 20 may overlap a portion of the first transaction card 10 and be joined to the first transaction card 10 at the overlap. In another embodiment, the first and second transaction cards 10,20 may be made separately and attached to a carrier, such as a sheet of cardboard or other material. The cards 10,20 may be connected to the carrier by glue, mechanical fasteners, or any other suitable means. The first and second transaction cards 10,20 may be arranged so that information or other features on one or both of the cards 10,20 are obscured from view until the first and/or second transaction cards 10,20 are separated from each other or a carrier. For example, the first transaction card 10 may be a prepaid phone card having a personal identification number (PIN) or other character sequence that is used to obtain prepaid telephone services. The second transaction card 20 may be attached to the first transaction card 10, or the first transaction card 10 may be connected to a carrier, so that the PIN or other sequence is obscured from view (at least without detection) until after the phone card is activated at the time of purchase.

In the illustrative embodiment shown in FIG. 2, the first and second transaction cards 10,20 are attached along a long edge 11b of the cards. Both cards 10,20 in this embodiment have an approximately rectangular shape with two opposite long edges 11a and 11b and two opposite short edges 12a and 12b. It should be understood, however, that the cards 10,20 may be connected at any one (or more) of the edges 11a, 11b, 12a and 12b, or a combination of edges, such as edges 12a and 11b, if desired. Also, although the first and second transaction cards 10,20 are shown in FIG. 2 as having an approximately rectangular shape, the first transaction card 10 and/or the second transaction card 20 may have any suitable shape, such as any polygon, circle, oval, and so on. Further, the second transaction card 20 need not have the same shape or size as the first transaction card 10 and may have several different, separable portions. For example, the first and second cards 10,20 may be made of a same sheet of material, and have an intermediate portion that connects the cards 10,20 together where a line of weakness is formed at the junction of the intermediate portion and the first card 10 and at the junction of the intermediate portion and the second card 20.

The first transaction card 10 and/or the second transaction card 20 may include any printed matter or otherwise display any suitable information, such as an advertisement, a credit card number, a message, an account number, a PIN number, one or more labels 14 adhered to the first transaction card 10 or the second transaction card 20 that include information or cover information on the first transaction card 10 or the second transaction card 20, and so on. Such information may be carried on either or both sides of each card. Thus, text or graphics information may be printed directly onto, physically stamped into, adhered to, or otherwise placed, e.g., by a label 14, on the first transaction card 10 and/or the second transaction card 20.

The first and/or second transaction cards 10,20 may include one or more machine readable features either of the same type or of different types, e.g., two magnetic strips, a magnetic strip on one card and a barcode on the other card, etc. Further, the machine readable features, like any other information on the first and/or transaction cards 10,20 may be placed on any suitable side or location of the cards. In the example shown in FIG. 3, the first and second transaction cards 10,20 include a machine readable feature in the form of a magnetic strip 13. The magnetic strip 13 may be encoded with suitable information as is common with gift cards, credit cards, debit cards and automatic teller machine (ATM) cards. The magnetic strip 13 may be heat laminated to the first transaction card 10, e.g., in a way to meet current or future ANSI and ISO standards, or may be formed anywhere on the transaction card in other ways. For example, the magnetic strip 13 may be fixed to the first transaction card 10 by an adhesive and/or arranged over the entire back surface of the cards 10,20 (e.g., a full magnetic back). Although FIG. 3 shows the magnetic strips 13 on the same side of the assembly 1, the magnetic strips 13 may be formed on opposite sides, the front only, the back only, etc. Use of a magnetic strip 13 that meets ANSI and ISO specifications may be required for specific applications, such as credit card applications where the magnetic strip 13 may be repeatedly read over its lifetime. However, the magnetic strip 13 may be fixed to the first transaction card 10 in a less robust way for less demanding applications, such as where the magnetic strip 13 may be read only once or twice over its lifetime. Although only two magnetic strips 13 are shown extending along opposite edges of the first and second transaction cards 10,20, the magnetic strips 13 may be located in any other suitable position, e.g., extend between the long edges 11 or the short edges 12 of the cards, and so on.

The first and/or second transaction cards 10,20 may each include two or more machine readable features, such as a barcode and magnetic strip on each card, or other arrangements. Also, the first and/or second transaction cards 10,20 may include machine readable features that are more active devices, such as semiconductor devices found in electronic cash cards like that described in U.S. Pat. No. 5,971,282. Thus, the first and/or second transaction cards 10,20 may include any suitable electronic device capable of providing identification information, receiving and processing information or performing other desired transaction functions. The machine readable features may be used to store, obtain, transmit or otherwise handle any type of information, such as text, biometrics information (such as eyescan or fingerprint information) and so on.

The first and/or second transaction cards 10,20 (or other portion connected to the cards, such as a waste or hanger portion) may include a hole 21 to hang or otherwise secure the transaction card assembly 1, the first transaction card 10 and/or the second transaction card 20 to a hook, key chain or other support. Although a hole 21 is shown at the top center of the first card 10, the hole 21 (or holes) may be provided in any suitable location and/or in any suitable size or shape. The first transaction card 10 and/or the second transaction card 20 may also include other similar features, such as a clip, pin or other fastener.

As discussed above, one or more labels 14 may be attached to the assembly 1, e.g., to the first transaction card 10 and/or the second transaction card 20. A label 14 may be attached so that the label 14 is removable and reusable, e.g., can be removed and adhered again to the first transaction card 10 and/or the second transaction card 20 or to another surface (such as a registration form), so that the label 14 is removable but cannot be reattached to any surface (such as when covering a PIN), or so that the label 14 is not removable (without damaging the label 14 as in a scratch-off label). The label 14 may include any information, e.g., that is printed on the label 14. The label 14 may include a machine readable feature, such as a barcode, that is adhered to the first transaction card 10 and/or the second transaction card 20.

Figure 4:
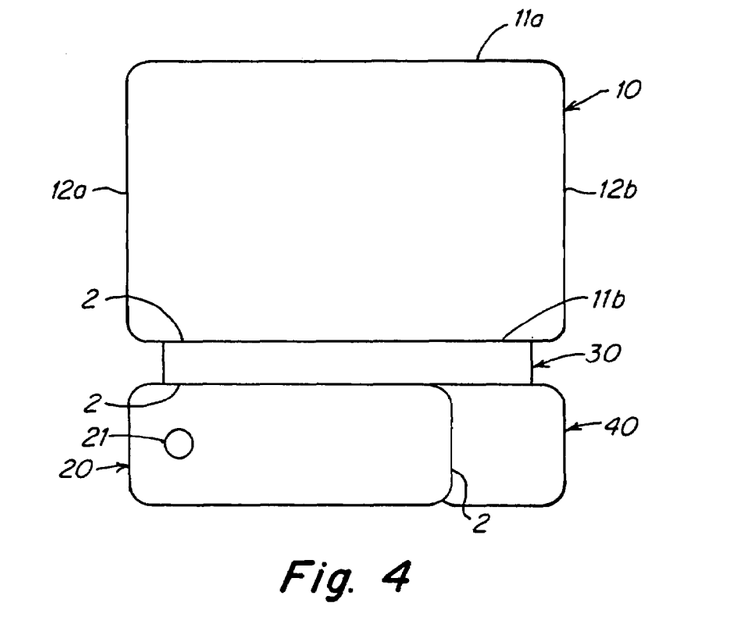
FIG. 4 is a first side of a transaction card assembly in accordance with another embodiment of the invention.
Figure 5:
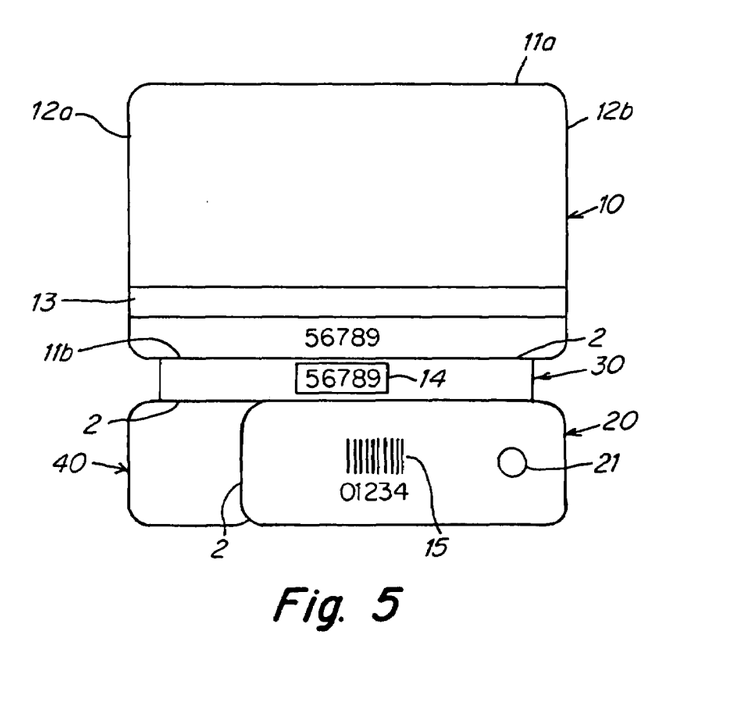
FIG. 5 is a second side of the transaction card assembly of FIG. 4.

FIGS. 4 and 5 show first and second sides, respectively, of another illustrative embodiment of the invention. In this embodiment, the first transaction card 10 has a standard rectangular shape (e.g., a so-called CR-80 format), and the second transaction card 20 has a smaller keytag shape. Also included are an intermediate portion 30 and a coupon portion 40. Although functional names have been provided for each of the portions 30 and 40 in this embodiment, these names have been used for ease of reference and understanding, but should not be construed as limiting the possible functions to be performed by or other features to be included in any of the portions 30 or 40.

In this embodiment, the first and second transaction cards 10,20 are formed from a single sheet of material that is stamped to define the outer periphery of the first transaction card 10 and second transaction card 20, as well as optional hole 21 in the second transaction card 21 (although the hole 21 is not required). The stamping process may also include a scoring and/or perforating function to form the lines of weakness 2 as the junctions between the first transaction card 10 and the intermediate portion 30, between the intermediate portion 30 and the second transaction card 20, and between the second transaction card 20 and the coupon portion 40. However, as discussed above, the various portions of the transaction card assembly 1 may be separately formed and then joined together in any suitable way. For example, the first and second transaction cards 10,20, the intermediate portion 30 and/or the coupon portion 40 may be separately formed and then connected in an edge-to-edge fashion and/or to a carrier by an adhesive, thermal welding or other suitable process.

As with the other examples described above, the first and second transaction cards 10,20, the intermediate portion 30 and/or the coupon portion 40 may include any type of printed information, such as advertisements, coupon or other purchase rebate information, a vendor name, logos, graphics and so on, or no information at all. The cards 10,20 may include any number of suitable machine readable features including an account number or other information as desired. In this example, the first transaction card 10 includes a magnetic strip 13 and printed alphanumeric text near the intermediate portion 30, and the second transaction card 20 includes a barcode 15 and printed alphanumeric text. However, the cards 10,20 may be arranged in any suitable way. In short, the invention is not limited in the way that information is presented or the type of information presented on any portion of the transaction card assembly 1.

Indicia included in a magnetic strip 13, label 14, barcode 15, printed text or other machine readable feature on the cards 10,20 may be unique with respect to the respective transaction card in a set of transaction card assemblies 1. For example, each transaction card assembly 1 may include a card 10,20 with indicia, such as an account number, that is unique to that transaction card. A plurality of transaction card assemblies 1 each having unique indicia on the cards 10,20 may be included in a set of assemblies 1 that are used, for example, as part of a member transaction tracking system, such as a frequent flyer program or grocery store membership program. This indicia may be used activate the transaction cards 10,20 at the time of purchase or other suitable time. If the indicia on a label 14 on the assembly 1 matches indicia in another machine readable feature on the first transaction card 10 (such as indicia encoded in a magnetic strip 13), the label 14 may be removed from the first transaction card 10 when the first transaction card 10 is placed into service. For example, as part of an issuee registration procedure, an issuee may complete a registration form including the issuee's name, address and other suitable information and place the label 14 containing the unique indicia on the registration form. Thus, the issuee of first transaction card 10 issuer may be more easily assured that the proper indicia, such as an account number included on the label 14 and in the magnetic strip 13, is included in the registration form. This can ensure that the proper issuee information is associated with the account number included in the first transaction card 10 and allow the associated account to be activated.

The embodiment shown in FIGS. 4 and 5 is only one example of a transaction card assembly 1. It should be understood that various portions may be omitted, added, and/or moved in position relative to other portions, and so on. For example, the intermediate portion 30 may be omitted and the coupon portion 40 and the second transaction card 20 may be directly adjacent to the first transaction card 10. As another example, the coupon portion 40 may be omitted and the second transaction card 20 made longer. The second transaction card 20 or other portion may be provided along the sides 12a and/or 12b, or any suitable combination of sides. Two or more transaction cards 20 (whether in keytag form, CR-80 format, or other) may be provided in any connection arrangement with the first card 10. Any of the portions 30 and 40 may also include a machine-readable feature, such as a magnetic strip, barcode, electronic chip or other device, and so on. The machine readable features may be arranged in any suitable way, e.g., the magnetic strips may be oriented in any direction on any of the cards or portions, an electronic chip may be embedded in or otherwise associated with any one of the cards or portions, and so on.

The arrangements shown in FIGS. 2-5, and other described or similar arrangements, allow encoding of the magnetic strip, application of and/or printing of indicia on the label 14 and/or printing of the bar codes and/or application of other information on the transaction card assembly 1 while the transaction card assembly 1 is fully assembled. As one example manufacturing process, a sheet of material, e.g., a sheet of PVC, may be provided to form a plurality of transaction card assemblies 1. Information for a plurality of transaction card assemblies 1, e.g., advertisements, text, graphics, holograms, bar codes, magnetic strips, embossed features, etc., may be printed, stamped or otherwise formed on one or both sides of the sheet. A magnetic strip may be formed, e.g., by a thermal lamination process, along a length of the sheet, and optionally encoded with information for a plurality of transaction card assemblies 1. Labels 14 for a plurality of transaction card assemblies 1 may be applied to the sheet and information printed on the labels (if the information is not included on the labels before the labels are applied). The sheet may then be cut, e.g., stamped or die cut, so that the individual transaction card assemblies 1 are formed and separated from the sheet. Lines of weakness 2 may also be formed between the transaction cards 10,20 and/or other portions, e.g., at the time of cutting the assemblies 1 from the sheet. Of course, the steps in this process may be performed in any suitable order, e.g., encoding after or before cutting in full sheets or individual cards, applying labels 14 before or after printing information on the sheet, applying the magnetic strip before or after cutting, etc.

In another aspect of the invention, a transaction card assembly 1 may include two or more cards that are related to a same account. However, while one of the cards may have a full range of privileges with respect to the account, such as allowing the card holder to deposit funds into the account, withdraw an unlimited amount of funds, etc., another of the cards may have a limited set of privileges associated with it, such as permission to withdraw/spend a maximum fund amount each month. For example, the first transaction card 10 in the FIGS. 2 and 3 embodiment may have full privileges with respect to an account, such as a bank account, gift card account, credit card account, etc. The holder of the first transaction card 10 may use the card to purchase goods and/or services (at only one issuer of the assembly 1 or a plurality of entities), provide funds into an account associated with the card (e.g., to recharge a gift card or pre-paid credit card, etc.), to check an account balance, adjust the privileges of other cards related to the account, etc. The holder of the second transaction card 20 may have a more limited set of privileges, such as the ability to withdraw or otherwise use a limited amount of funds in an account shared with the first transaction card 10 over a given time period. For example, the holder of the second transaction card 20 may be limited to withdrawal or other use of only $50 per month. The shared account may have funds directed into it from any suitable source, such as an employer of the holder of the first transaction card 10 who deposits the holders pay (or a portion of the pay) into the account at the end of each pay period. Of course, the transaction card assembly 1 may include other cards that have any suitable set of permissions with respect to the account.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A transaction card assembly comprising: at least a first transaction card having a first machine readable feature that is useable in a transaction involving the first transaction card, the first machine readable feature including information representing a first account associated with the first transaction card, the first transaction card useable only in a transaction with a first issuer of the first transaction card for the purchase of products and/or services sold by the first issuer; and at least a second transaction card having a second machine readable feature that is useable in a transaction involving the second transaction card, the second machine readable feature including information representing a second account associated with the second transaction card, the second transaction card useable in a transaction with an entity other than the first issuer to purchase products and/or services sold by the entity, the transaction with the entity being completed without any involvement of the first issuer; wherein the first and second transaction cards are connected together and arranged for selective separation by a user at or before a time of using the first or second transaction cards, and wherein a line of weakness is provided between the first and second transaction cards.

2. The assembly of claim 1, wherein the second transaction card is useable only with a second issuer of the second transaction card, where the second issuer is different from the first issuer.

3. The assembly of claim 1, wherein both the first and second accounts are activated by activation of one of the first and second accounts.

4. The assembly of claim 1, further comprising at least a third transaction card.

5. The assembly of claim 1, wherein the first and second transaction cards are formed from a same sheet of material, and the line of weakness includes a scoring on at least one side of the sheet of material.

6. The assembly of claim 5, comprising an additional portion formed from the same sheet of material, the line of weakness including scoring between the additional portion and one of the first and second transaction cards.

7. The assembly of claim 1, wherein the first and second machine readable features each include an encoded magnetic strip, printed text, a barcode or an electronic device.

8. The assembly of claim 1, further comprising a portion with a hole formed through the portion.

9. The assembly of claim 1, wherein the first and second transaction cards are gift cards.

10. The assembly of claim 1, further comprising a label.

11. The assembly of claim 10, wherein the label includes indicia that corresponds to indicia included in the first or second machine readable feature.

12. The assembly of claim 11, wherein the label is removable and adherable to another surface.

13. The assembly of claim 10, wherein the label obscures information on the first or second transaction card.

14. The assembly of claim 13, wherein the label obscures a PIN number for a prepaid telephone account.

15. The assembly of claim 1, wherein the first and second machine readable features each include indicia unique from each other that is formed in the first and second machine readable features while the first and second transaction cards are connected to each other.

16. The assembly of claim 1, wherein each of the first and second transaction cards have an approximately rectangular shape, are approximately the same size, and are connected to each other along long edges of the first and second transaction cards.

17. The assembly of claim 1, wherein the first and second transaction cards are connected together in an edge-to-edge fashion, the first and second transaction cards being arranged to allow the transaction cards to be separated without tools, at least one of the first and second transaction cards meeting ANSI and ISO specifications for edge roughness for a transaction card after being separated from the other transaction card.

18. The assembly of claim 1, wherein each of the first and second transaction cards is a gift card, a prepaid phone card, a pre-paid credit card, a frequent shopper card, a loyalty card, a health care card, or a membership card.

19. A method for forming a transaction card assembly having at least first and second transaction cards, comprising: providing a single sheet of material; cutting at least one transaction card assembly including at least first and second transaction cards from the sheet of material; providing a line of weakness between the first and second transaction cards so that the first and second transaction cards are separable from each other without the use of tools and so that once separated, the first and second transaction cards cannot be reconnected to form the single sheet transaction card assembly; providing a machine readable feature for each of the transaction cards, the machine readable features including indicia unique from each other; wherein the first transaction card is useable only in a transaction with a first issuer of the first transaction card for the purchase of products and/or services sold by the first issuer; and a second transaction card is useable in a transaction with at least one entity other than the first issuer, the at least one entity selling products and/or services to be purchased using the second transaction card and without any involvement of the first issuer.

20. The method of claim 19, wherein the step of forming the line of weakness includes scoring the sheet of material so that the first or second transaction card meets ANSI and ISO specifications for edge smoothness after being separated without tools from the other transaction card.

21. The method of claim 19, wherein the second transaction card is useable only in a transaction with a second issuer different from the first issuer.

22. The method of claim 19, wherein the step of providing a machine readable feature comprises:
forming a magnetic strip on the first and second transaction cards; and
encoding the magnetic strips.

23. The method of claim 19, further comprising:
adhering a label to the transaction card assembly.

24. The method of claim 23, further comprising:
printing information on the label while the first and second transaction cards are connected together.

25. The method of claim 23, further comprising:
printing indicia on the label that corresponds to indicia in a machine readable feature on one of the first and second transaction cards.

26. The method of claim 23, wherein the step of providing a label comprises:
providing a label that is removable and adherable to another surface.

27. The method of claim 19, wherein the step of cutting comprises:
cutting so that the first and second transaction cards have an approximately rectangular shape of approximately the same size.

28. The method of claim 19, wherein the step of providing the machine-readable feature comprises:
attaching an electronic device to at least one of the first and second transaction cards.

29. The method of claim 19, further comprising:
printing information on the first transaction card representing the first issuer of the first transaction card; and
printing information on the second transaction card representing a second issuer of the second transaction card.

30. A method of providing transaction card assemblies, comprising: providing a transaction card assembly having at least first and second transaction cards connected to each other and including a line of weakness between the first and second transaction cards, the first transaction card having a first machine readable feature that is useable in a transaction involving the first transaction card, the first machine readable feature including information representing a first account associated with the first transaction card, the first transaction card useable only in a transaction with a first issuer of the first transaction card for the purchase of products and/or services sold by the first issuer, and the second transaction card having a second machine readable feature that is useable in a transaction involving the second transaction card, the second machine readable feature including information representing a second account associated with the second transaction card, the second transaction card useable in a transaction with an entity other than the first issuer, the entity selling products and/or services to be purchased using the second transaction card in the transaction, which is completed without any involvement of the first issuer, where the first and second transaction cards are arranged for selective separation by a user at or before a time of using the first or second transaction cards; reading one of the first and second machine readable features to obtain information representing the first or second account; electronically transmitting the information; and activating the first and second accounts so as to render the first and second transaction cards useable in one or more transactions.

31. The method of claim 30, wherein the step of reading comprises:
reading information from a magnetic strip, printed alphanumeric text, a barcode or electronic device associated with the first or second transaction card.

32. The method of claim 30, wherein the step of activating comprises:
activating both the first and second accounts based on information read from the machine readable feature from only one of the first and second transaction cards.

33. The method of claim 30, wherein the first transaction card is a gift card useable for purchases with a first issuer retailer, a pre-paid telephone card useable for making telephone calls, or a pre-paid credit card.

34. The method of claim 33, further comprising:
displaying the transaction card assembly at a point of sale;
receiving funds from a purchaser of the transaction card assembly; and
reading the first or second machine readable feature at the point of sale to initiate activation of the first and second accounts.

35. The method of claim 30, wherein the first transaction card includes a magnetic strip and the second transaction card includes a barcode.

* * * * *